United States Patent [19]

Kubo et al.

[11] Patent Number: 4,670,836
[45] Date of Patent: Jun. 2, 1987

[54] DEVICE FOR DETECTING AN OVERLAP OF OPERANDS TO BE ACCESSED

[75] Inventors: Kanji Kubo, Hadano; Kenichi Shiozaki, Odawara, both of Japan

[73] Assignee: Hitachi, Ltd., Tokyo, Japan

[21] Appl. No.: 618,257

[22] Filed: Jun. 7, 1984

[30] Foreign Application Priority Data

Jun. 13, 1983 [JP] Japan ................................ 58-105528

[51] Int. Cl.[4] .............................................. G06F 9/38
[52] U.S. Cl. ................................................. 364/200
[58] Field of Search ... 364/200 MS File, 900 MS File

[56] References Cited

U.S. PATENT DOCUMENTS

| 3,728,692 | 4/1973 | Fennel, Jr. | 364/200 |
|---|---|---|---|
| 4,085,450 | 4/1978 | Tulpule | 364/900 |
| 4,251,859 | 2/1981 | Momose et al. | 364/200 |
| 4,398,245 | 8/1983 | Fujita | 364/200 |
| 4,454,578 | 6/1984 | Matsumoto et al. | 364/200 |

Primary Examiner—Thomas M. Heckler
Attorney, Agent, or Firm—Antonelli, Terry & Wands

[57] ABSTRACT

In order to guarantee the instruction execution sequence in a pipeline control data processing system, the present overlap detector device detects whether or not the operands overlap each other in access width units by comparing the store address specified by a store instruction with the fetch address contained in a fetch instruction following the store instruction. Moreover, the overlap detector device detects whether or not an overlap occurs in an area of the access width based on the store mark, the address in the access width unit stored in the fetch address, and the fetch data length. The overlap detector device detects the presence or absence of an overlap according to the results of operations for detecting these two overlap conditions.

5 Claims, 8 Drawing Figures

FIG. 4a

CONDITIONS FOR PRESENCE OF 4-BYTE CROSS

| BITS 30 AND 31 OF FETCH ADDRESS REGISTER | DATA LENGTH REGISTER |
|---|---|
| 0 0 | 100 ~ 111 |
| 0 1 | 011 ~ 111 |
| 1 0 | 010 ~ 111 |
| 1 1 | 001 ~ 111 |

FIG. 4b

CONDITION FOR ABSENCE OF 4-BYTE CROSS

| BITS 30 AND 31 OF FETCH ADDRESS REGISTER | DATA LENGTH REGISTER |
|---|---|
| 0 0 | 000 ~ 011 |
| 0 1 | 000 ~ 010 |
| 1 0 | 000 ~ 000 |
| 1 1 | 000 | ically exist. Since
a reading of a data item from the memory by the succeeding fetch instruction is delayed until the preceding instruction completely stores a data item in the memory when the overlap is detected, the pipeline cannot be operated properly and the performance is deteriorated.

DEVICE FOR DETECTING AN OVERLAP OF OPERANDS TO BE ACCESSED

BACKGROUND OF THE INVENTION

This invention relates to an improvement of a device for detecting overlap of operands in a memory, which operands are specified by a store instruction and a fetch instruction, respectively, in a pipeline control data processing system.

In a pipeline control data processing system, the effective instruction processing time is minimized by executing a plurality of instructions in parallel. Although the pipeline control data processing system performs parallel processing of several instructions, the sequence for executing such instructions must be guaranteed. According to the pipeline control, when a store instruction for writing a data item in a memory is followed by a fetch instruction for reading a data item from the memory, a fetch request due to the fetch instruction following the store instruction may take place before a store request by the store instruction. To guarantee the sequence for executing the instructions in this situation, the system checks whether or not the memory area to be changed by the preceding store instruction overlaps with the memory area from which a data item is read by the succeeding fetch instruction. If it is found that they overlap each other, the processing of the fetch instruction must be set to and retained in the wait state until the processing of the preceding store instruction is completed. However, such an overlap between a store instruction and a fetch instruction is detected according to the memory access width in the conventional art, hence an overlap is detected even when there does not actually exist any overlap, thereby degrading the advantage of the pipeline control. For example, in a data processing system whose memory access width is eight bytes, when the preceding store instruction changes the first four bytes in an 8-byte memory boundary and the succeeding fetch instruction reads the last four bytes from the 8-byte memory boundary, an overlap is detected although an overlap does not actually exist. Since a reading of a data item from the memory by the succeeding fetch instruction is delayed until the preceding instruction completely stores a data item in the memory when the overlap is detected, the pipeline cannot be operated properly and the performance is deteriorated.

SUMMARY OF THE INVENTION

An object of the present invention is to provide a device which detects the overlap which takes place in a unit less than the memory access width.

According to the present invention, a first detecting means compares the store address specified by the preceding store instruction with the fetch address contained in the succeeding fetch instruction to detect whether or not the operands overlap each other in access width units, while the second detecting means detects whether or not the operands overlap each other in the access width range by use of the store mark representing the presence/absence of the effective store data, the address within the access width unit stored in the fetch address, and the fetch data length. An output means outputs an overlap signal when said first means and said second means detect the operand overlap, respectively, in said device.

BRIEF DESCRIPTION OF THE DRAWINGS

FIGS. 4a and 4b outline the conditions for the presence/absence of a 4-byte cross in the 4-byte cross detector circuit illustrated in FIG. 1.

DESCRIPTION OF THE PREFERRED EMBODIMENTS

Figure 1:
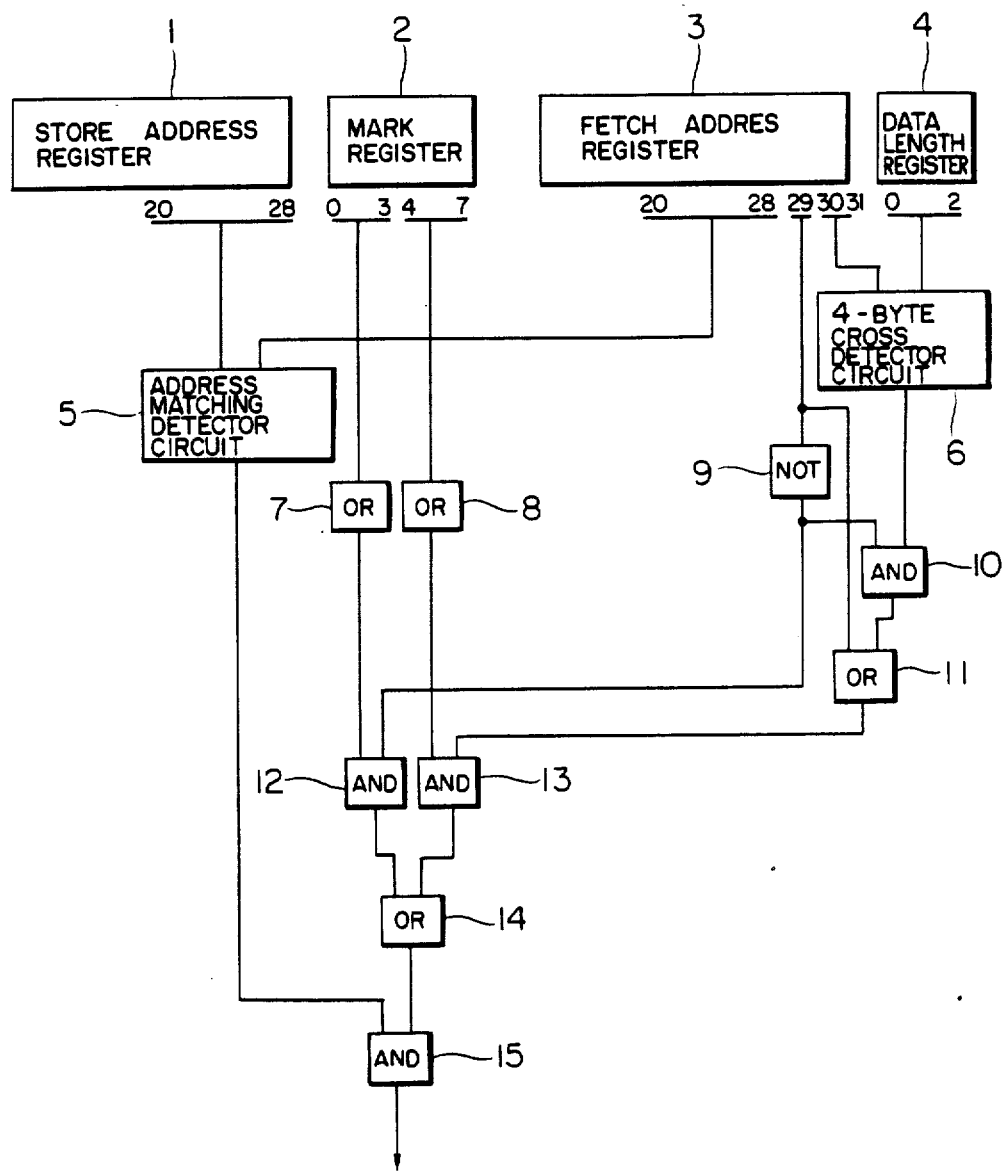
FIG. 1 is a block diagram illustrating an embodiment of the present invention.

FIG. 1 depicts an embodiment according to the present invention. In this embodiment, the memory is addressed with a 32-bit address (the bit 0 is the most-significant bit, while bit 31 is the least-significant bit) in byte units, the memory page size is four kilobytes, the memory access width is eight bytes, and the overlap detect unit is four bytes obtained by dividing the access width by two. Consequently, the address bits 0-19 indicate a page address, address bits 20-28 an 8-byte unit address-in-page, and address bits 29-31 a byte address in an 8-byte unit field.

In FIG. 1, a store data address is stored in the store address register 1 and the bits 20-28 of the address indicates an 8-byte access width address in a page. The mark register 2 comprises eight bits and is used to store a store mark to indicate the store data presence/absence for each byte of the 8-byte access width. That is, each bit of the mark register corresponds to each byte position of the 8-byte access width. If a bit is "1", the store data exists at the corresponding byte position; and if the bit is "0", the store data does not exist at the corresponding position. For example, if the 8-bit store mark is "00111100", the store data is found at the byte positions 2-5 in the 8-byte access width. The fetch address register 3 is used to store the first address of fetch data, and the bit positions 20-28 indicate an address in a page of the 8-byte access width and bits 29-31 an address in the 8-byte field. The data length register 4 indicates the fetch data length in the 8-byte boundary; three bits are used to indicate the data length (one byte to eight bytes). For example, if the data length register contains "000", the fetch data length is one byte, and if it contains "111", the length is specified to be eight bytes. The store address and mark are set to the registers 1 and 2, respectively by a store instruction; while the fetch address and data length are set to the registers 3 and 4, respectively, by a fetch instruction following the store instruction.

The address matching detector circuit 5 detects a matching condition between the store and fetch addresses in 8-byte units according to the memory access width. The 4-byte cross detector circuit 6 is used to detect whether or not the data to be fetched crosses (astrides) a 4-byte data boundary. The bits 0-3 and bits 4-7 of the mark register 2 are ORed by the OR circuits 7 and 8, respectively. The NOT circuit 9 is used to reverse the value of bit 29 of the fetch address register 3, the AND circuit 10 to AND the outputs from the 4-byte cross detector circuit 6 and the NOT circuit 9, and the OR circuit 11 to OR the bit 29 of the fetch address register 3 and the output from the AND circuit 10. The outputs of the OR circuit 7 and the NOT circuit 9 are ANDed by the AND circuit 12, the outputs of the OR circuits 8 and 11 are ANDed by the AND circuit 13, the outputs of the AND circuits 12 and 13 are ORed by the OR circuit 14, and the outputs of the matching detector circuit 5 and the OR circuit 14 are ANDed by the AND circuit 15.

Operations of an embodiment depicted in FIG. 1 will be described. Assume that a store address and a store mark are stored in the store address register 1, and the mark register 2, respectively, because of a store instruction issued to store a data item in the memory and that the first fetch address and the fetch data byte length are stored in the fetch address register 3 and the fetch data length register 4, respectively, due to a fetch instruction issued after the store instruction to read a data item from the memory. The address matching detector circuit 5 compares the content of the store address register 1 and the bits 20–28 of the fetch address register 3 indicating an address-in-page. If they are found to be equal, the matching detector circuit 5 outputs "1", otherwise, it outputs "0".

In this embodiment, logical addresses are used as the store and fetch addresses to be set to the store address register 1, and the fetch address register 3, respectively. In a data processing system handling a virtual space, it is known that a logical address is specified by an instruction for accessing the memory and that the real memory is accessed by use of a real address obtained by translating the logical address. Only the portion of bits 0–19 specifying a page address is translated, that is, the bits 20–31 indicating an address-in-page are commonly used for the logical and real addresses. The real address for accessing the real memory should be used to detect the overlap; however, since a comparison of the real address after the address translation is time consuming, the logical address is used for the comparison. The real-address comparison may be naturally conducted if the time delay due to the address translation is allowable for detecting the overlap.

Moreover, the matching detector circuit 5 processes a logical address, thus an address-in-page specified by the bits 20–28 is compared. Therefore, even if the same address-in-page is found for the different pages, the overlap is assumed to be detected. This is because the different logical addresses may be translated into the same real address in some software systems. If the software guarantees that the different logical addresses will not be assigned to the same real address, the matching detector circuit 5 may be designed to compare the store address bits 0–28 with the fetch address bits 0–28.

If the matching detector circuit (5) outputs "0", the operands of the store and fetch operations do not overlap within the 8-byte boundary (memory access width unit) in the memory; hence the pipeline control normally functions properly to execute the preceding store instruction and the succeeding fetch instruction in parallel. On the other hand, if the output of the matching detector circuit 5 is "1", the operands of the store and fetch instructions overlap each other in an 8-byte memory boundary. In this case, an overlap condition is conventionally assumed to be satisfied, so the memory read operation by the succeeding fetch instruction is delayed until the data is completely stored in the memory by the preceding store instruction. Differing from this method, an embodiment depicted in FIG. 1 checks for an overlap in the first and second four bytes of the area in the 8-byte memory boundary. If the overlap condition is not detected in these 4-byte fields, the overlap is not assumed to be satisfied even if an overlap condition within the 8-byte boundary is detected. In this regard, the system operations will be described in detail hereinafter.

Figure 2A:
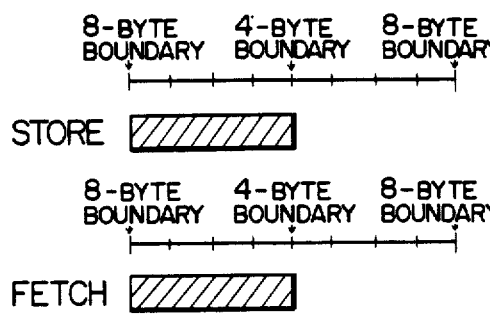
FIGS. 2a, 2b, and 3a to 3c depict examples of the presence/absence of overlap of the store and fetch memory areas in the unit less than the memory access width.

First, referring to FIGS. 2a and 2b, the operations will be explained for a case in which the valid data to be stored in the memory exists only in the first four bytes within the 8-byte memory boundary.

In this case, the outputs of the OR circuits 7 and 8 are "1" and "0", respectively. As illustrated in FIG. 2a, if the fetch address specifies an arbitrary byte of the first four bytes in the 8-byte boundary, the bit 29 of the fetch address register 3 is "0". The value of bit 29 is reversed by the NOT circuit 9, and the resultant data is ANDed in the AND circuit 12, then the output of the AND circuit 15 via the OR circuit 14 becomes "1", thus an overlap is detected.

Figure 2B:
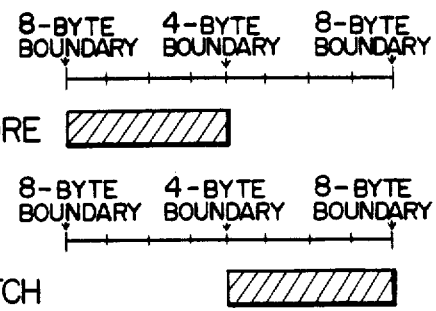

On the other hand, as depicted in FIG. 2b, if the fetch address specifies an arbitrary byte of the last four bytes in the 8-byte boundary, the bit 29 of the fetch address register 3 is "1", so the AND condition is not satisfied in the AND circuit 12. Furthermore, since the OR circuit 8 outputs "0", the AND condition is not satisfied in the AND circuit 13, either. Consequently, even if an overlap is detected in the 8-byte boundary and the output of the matching detector circuit 5 is "1", the AND circuit 15 outputs "0" and the overlap is not assumed to be detected.

Next, referring to FIG. 3, the operations will be described for a case in which the valid data to be stored in the memory only exists in the last four bytes of an area in the 8-byte boundary.

Figure 3A:
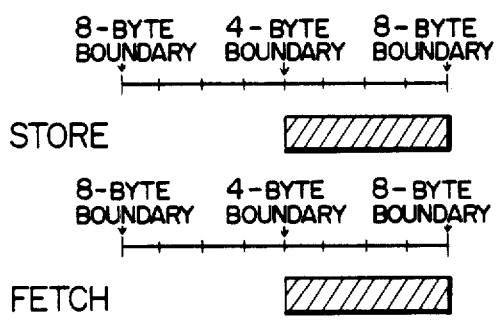

In this case, the outputs of the OR circuits 7 and 8 are "0" and "1", respectively. As illustrated in FIG. 3a, if the fetch address specifies an arbitrary byte of the last four bytes in the 8-byte boundary, the value of bit 29 of the fetch address register 3 is "1". The bit 29 is inputted to the AND circuit 13 via the OR circuit 11, that is, the input is ANDed in the AND circuit 13, thus an overlap is detected according to the output of the AND circuit 15.

On the other hand, if the fetch address specifies an arbitrary byte of the first four bytes in the 8-byte boundary, the value of bit 29 of the fetch address register 3 is "0". In this case, it is checked whether or not the fetch data stradles (crosses) the 4-byte boundary in the 8-byte boundary by use of the fetch data length. If such a condition is found, an overlap must be assumed to take place; otherwise, it must not be assumed to be detected. These operations are carried out by the 4-byte cross detector circuit 6.

The 4-byte cross detector circuit 6 inputs the values of bits 30 and 31 from the fetch address register 3 and the fetch data length from the register 4. If one of the logical conditions listed in FIG. 4a is satisfied between these input values, a 4-byte cross is assumed to take place. If any other condition listed in FIG. 4b is met, the 4-byte cross is not assumed to be detected. For example, if the bits 30 and 31 of the fetch address register 3 are "00" (the bit 29 is "0"), the address in the 8-byte area stored in the fetch address indicates byte 0. In this case, therefore, if the fetch data length is five bytes or more (the value of register 4 is at least "100"), a 4-byte cross is assumed to be detected. If the fetch data length is four bytes or less (the value of register 4 is at most "011"), a 4-byte cross is not assumed to take place. If the bits 30 and 31 of the fetch address register 3 are "01", the address in the 8-byte area indicates byte 1. In this case, a 4-byte cross is detected if the fetch data length is four bytes or more (the value of register 4 is at least "011"), while it is not detected if the fetch data length is three bytes or less (the value of register 4 is at most "010"). If the bits 30 and 31 of the fetch address register 3 are "10", the address in the 8-byte area indicates byte 2. In this case, a 4-byte cross is assumed to occur if the fetch data length is three bytes or more (the value of register 4 is at least "010"), while a 4-byte cross is not assumed to be found if the fetch data length is two bytes or less (the value of register 4 is at most "001"). If the bits 30 and 31 of the fetch address register 3 are "11", the address in the 8-byte area indicates byte 3. In this case, a 4-byte cross is detected if the fetch data length is two bytes or more (the value of register 4 is at least "001"), while a 4-byte cross is not detected only if the fetch data length is one byte (the value of register 4 is "000").

Figure 3B:
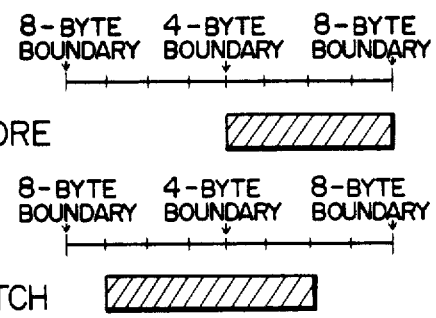
Figure 3C:
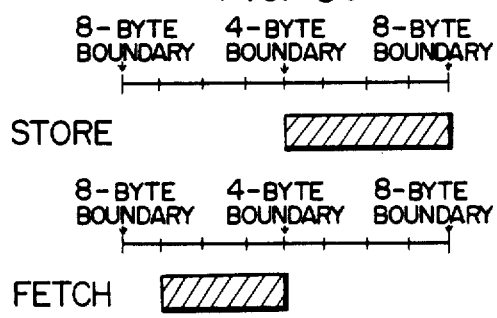

If the 4-byte cross detector circuit 6 detects a 4-byte cross condition as explained above, it outputs "1"; otherwise it outputs "0". Since the bit 29 of the fetch address register 3 is now "0", the AND operation is performed by the AND circuit 10 if the 4-byte cross detector circuit 6 outputs "1". Since the valid data to be stored in the memory is assumed to exist in the last four bytes of the area within the 8-byte boundary, the output of the OR circuit 8 is "1", and the AND condition is satisfied in the AND circuit 13 according to the ANDed result from the AND circuit 10. Thus, the output of the AND circuit 15 via the OR circuit 14 becomes "1" and an overlap is assumed to be detected. This case is illustrated in FIG. 3b in which the address in the 8-byte area stored in the fetch address indicates byte 1 (the bits 30 and 31 of the fetch address register 3 are "01") and the fetch data length is five bytes (the value of register 4 is "100").

On the other hand, if the 4-byte cross detector circuit 6 outputs "0", the AND condition is not satisfied in the AND circuit 10. Moreover, since the bit 29 of the fetch address register 3 is "0", the OR circuit 11 outputs "0". Therefore, the AND condition is not met in the AND circuit 13. Furthermore, since the valid data to be stored in the memory is assumed to exist in the last four bytes of the area within the 8-byte boundary, the output of the OR circuit 7 is "0" and the AND condition is not met in the AND circuit 12, either. As a result, the AND circuit 15 outputs "0", so an overlap is not assumed to be detected even if an overlap in the 8-byte boundary is detected and the matching detector circuit 5 outputs "1". This case is detected in FIG. 3c in which the address in the 8-byte area stored in the fetch address indicates byte 1 and the fetch data length is three bytes (the value of register 4 is "010").

Although the memory access width is assumed to be eight bytes in the embodiment of FIG. 1, this is not the limitation to the present invention. Furthermore, the overlap detection unit for the store and fetch operations is set to four bytes in the embodiment; however, this is only an example, and any overlap detection unit, if it is equal to or less than the memory access width, can be used. For example, it may be one byte or two bytes.

As is clear from the foregoing description, according to the present invention, an overlap between the operands in the memory which are specified by the preceding store instruction and the succeeding fetch instruction is detected in a unit equal to or less than the memory access width; consequently, the possibility of an overlap detection in a case in which the operands are not actually overlapping each other is almost completely removed, thereby allowing effective utilization of the pipeline control.

What is claimed is:

1. A device for detecting an overlap of operands to be accessed in a memory in a pipeline control data processing system, comprising:
   first register means for holding therein a store address of said memory specified by a store instruction;
   second register means for holding therein a store mask indicating the presence or absence of a store data item of an access width in byte units;
   third register means for holding therein a fetch address of said memory specified by a fetch instruction following said store instruction;
   fourth register reans for holding therein the length of a data item to be fetched by using said fetch address in said third register means as a start address for the data to be fetched;
   first detector means for detecting whether or not the operands to be accessed in said memory overlap each other in access width units based on said store address in said first register means and said fetch address in said third register means;
   second detector means for detecting whether or not said operands overlap each other in an area of said access width unit based on said store mark in said second register means, bits indicating an address in said access width unit of said fetch address in said third register means, and said fetch data length in said fourth register means; and
   means connected to said first and said second detector means for outputting an indication that said operands overlap each other when said first detector means and said second detector means detect an overlap, respectively.

2. A device for detecting an overlap of operands to be accessed in a memory in a pipeline control data processing system according to claim 1, wherein said second detector means comprises:
   first indiction means for indicating the presence or absence of said store data in each division unit obtained by subdividing by n said access width based on said store mark;
   second indication means for indicating said division unit to be fetched by said fetch address and said fetch data length; and
   means for detecting an overlap in said access unit based on information stored in said first and second indication means.

3. A device for detecting an overlap of operands to be accessed in a memory in a pipeline control data processing system according to claim 2, wherein each said first indication means comprises means for ORing said store marks in each of said division units with every other division unit.

4. A device for detecting an overlap of operands to be accessed in a memory in a pipeline control data processing system according to claim 1, wherein said store and fetch addresses indicate logical addresses.

5. A device for detecting an overlap of operands to be accessed in a memory in a pipeline control data processing system according to claim 4, wherein said store address and fetch address each comprise a page address portion, and a portion for an address in the access width unit; and
   said first detection means coxprises means for detecting a matching between said store address in said first register means and said fetch address in said third register means and a matching between said address in a page of said store address and said address in a page of said fetch address.

* * * * *